US010056674B2

(12) United States Patent
Hirabe

(10) Patent No.: US 10,056,674 B2
(45) Date of Patent: Aug. 21, 2018

(54) ANTENNA ORIENTATION ADJUSTMENT ASSISTANCE DEVICE AND ANTENNA DEVICE INSTALLATION METHOD

(71) Applicant: NEC Corporation, Tokyo (JP)

(72) Inventor: Masashi Hirabe, Tokyo (JP)

(73) Assignee: NEC Corporation, Tokyo (JP)

( * ) Notice: Subject to any disclaimer, the term of this patent is extended or adjusted under 35 U.S.C. 154(b) by 570 days.

(21) Appl. No.: 14/428,066

(22) PCT Filed: Jun. 12, 2013

(86) PCT No.: PCT/JP2013/003688
§ 371 (c)(1),
(2) Date: Mar. 13, 2015

(87) PCT Pub. No.: WO2014/045495
PCT Pub. Date: Mar. 27, 2014

(65) Prior Publication Data

US 2015/0263408 A1 Sep. 17, 2015

(30) Foreign Application Priority Data

Sep. 20, 2012 (JP) ................................ 2012-207054

(51) Int. Cl.
*G06K 9/36* (2006.01)
*H01Q 1/12* (2006.01)
*H01Q 3/02* (2006.01)

(52) U.S. Cl.
CPC ......... *H01Q 1/1257* (2013.01); *H01Q 1/1228* (2013.01); *H01Q 3/02* (2013.01); *Y10T 29/49016* (2015.01)

(58) Field of Classification Search
CPC .......... H01Q 1/12; H01Q 3/02; H01Q 1/1257; H01Q 1/1228; Y10T 29/49016; G06T 7/004; G01B 11/14
See application file for complete search history.

(56) References Cited

U.S. PATENT DOCUMENTS 8,134,512 B1 3/2012 Chen et al.
2002/0164945 A1 11/2002 Olsen et al.
(Continued)

FOREIGN PATENT DOCUMENTS

CN 1619880 A 5/2005
JP H07-162774 A 6/1995
(Continued)

OTHER PUBLICATIONS

International Search Report corresponding to PCT/JP2013/003688, dated Sep. 17, 2013 (5 pages).
(Continued)

*Primary Examiner* — Dieu H Duong
(74) *Attorney, Agent, or Firm* — Wilmer Cutler Pickering Hale and Dorr LLP

(57) ABSTRACT

An antenna orientation adjustment assistance device that allows any worker to quickly and accurately install an antenna device is provided. An antenna device (100) is temporarily installed. Further, a camera (200) is mounted on the antenna device (100). Then, the antenna orientation adjustment assistance device includes a reception strength detection unit (420) that detects a reception strength of radio waves received by an antenna unit (110), a position calculation unit (414) that calculates a relative angle position of the antenna unit (110) by using an image taken by a camera (200) fixed relative to the antenna unit (110), and a reception strength recording unit (430) that records the relative angle position of the antenna unit (110) and the reception strength at the relative angle position in association with each other.

6 Claims, 16 Drawing Sheets

(56) References Cited

U.S. PATENT DOCUMENTS

| | | | |
|---|---|---|---|
| 2002/0177405 A1 | 11/2002 | Chedester et al. | |
| 2010/0246886 A1 | 9/2010 | Nakamura et al. | |
| 2017/0179566 A1* | 6/2017 | Hirabe | H01Q 1/1257 |

FOREIGN PATENT DOCUMENTS

| | | | |
|---|---|---|---|
| JP | 08-316721 A | | 11/1996 |
| JP | H09-232847 A | | 9/1997 |
| JP | 2000-315907 A | | 11/2000 |
| JP | 2002-262166 A | | 9/2002 |
| JP | 2005-072780 A | | 3/2005 |
| JP | 2007-033380 A | | 2/2007 |
| JP | 2007-088576 A | | 4/2007 |
| JP | 2008-183184 A | | 8/2008 |
| JP | 2008-301074 A | | 12/2008 |
| JP | 2009-281977 A | | 12/2009 |
| JP | 2010-231371 A | | 10/2010 |
| JP | 2010-278807 A | | 12/2010 |
| JP | 2011151722 A | * | 8/2011 |
| WO | WO-02/089357 A1 | | 11/2002 |

OTHER PUBLICATIONS

Mexican Office Action issued by the Mexican Intellectual Property Office for Mexican Application No. MX/a/2015/003533 dated Jan. 17, 2017 (3 pages).

Extended European Search Report issued by the European Patent Office for Application No. 13838411.0 dated May 11, 2016 (9 pages).

Russian Office Action issued by the Patent Office of the Russian Federation for Application No. 2015114539/28(022700) dated Jun. 14, 2016 (13 pages).

Chinese Office Action issued by the State Intellectual Property Office of the People's Republic of China for Application No. 201380049102.6 dated Mar. 15, 2016 (14 pages).

* cited by examiner

ANTENNA ORIENTATION ADJUSTMENT ASSISTANCE DEVICE AND ANTENNA DEVICE INSTALLATION METHOD

CROSS-REFERENCE TO RELATED APPLICATIONS

This application is a national stage application of International Application No. PCT/JP2013/003688 entitled "Antenna Orientation Adjustment Assistance Device and Antenna Device Installation Method," filed on Jun. 12, 2013, which claims the benefit of the priority of Japanese Patent Application No. 2012-207054, filed on Sep. 20, 2012, the disclosures of each of which are hereby incorporated by reference in their entirety.

TECHNICAL FIELD

The present invention relates to a device that assists in adjusting the orientation of an antenna.

BACKGROUND ART

When installing a directional antenna, it is important to place it toward an appropriate direction in order to maximize the reception level. Currently, when adjusting the antenna orientation, a worker seeks the orientation with the maximum reception level by a process of trial and error by changing the antenna orientation in a step-by-step manner and installs the antenna in that orientation.

However, because two orientations, the elevation and the azimuth, need to be set to adjust the antenna orientation, it is extremely difficult in practice to set the antenna orientation toward the direction in which the maximum reception level can be achieved. It is time-consuming work to set the antenna toward the direction with the maximum reception level in a step-by-step manner by making fine adjustment of the elevation and the azimuth by checking the reception level each time. Since radio waves at millimeter-wave frequencies have been used recently, it is required to set the antenna orientation with respect to the wave source antenna with such accuracy as if going through the eye of a needle. For example, extremely fine angle adjustment of 1.0° or less, such as 0.4° or 0.2°, is required today. In consideration of the case of mounting the antenna on a mast or the like using mounting bracket, it should take less than one turn of a mounting screw. Considerable experience is needed for accurate adjustment of the antenna orientation by trial and error without any criteria like an index.

Methods for assisting in setting the antenna orientation toward the wave source direction are proposed (for example, Patent Literatures 1, 2 and 3).

For example, Patent Literature 1 discloses a direction finder that searches for a radio emitting source. The direction finder includes a direction finding array antenna and a camera mounted on the array antenna. A lens of the camera is aligned so that its optical axis is substantially orthogonal to the vertical plane of the array antenna. In this structure, an image of an object that is assumed to be a radio emitting source is taken by the camera. Further, a received signal that is received by the array antenna is visualized by a technique such as radio holography and output as a wave source image. Then, a screen, on which the camera image and the wave source image are displayed and superimposed on one another, is provided to a worker. By viewing the screen, the worker can specify the object as the radio emitting source.

In Patent Literatures 2 and 3, a camera that is aligned with respect to an antenna is mounted on the antenna, and the camera is used as a sighting device. A radio emitting source is specified by the camera, and the orientation of the antenna is adjusted so that the radio emitting source comes at the center of the screen. In this manner, specifying the radio emitting source by the camera or using the camera as the sighting device are helpful in adjusting the antenna orientation.

CITATION LIST

Patent Literature

PTL1: Japanese Unexamined Patent Application Publication No. 2007-33380

PTL2: Japanese Unexamined Patent Application Publication No. 2007-88576

PTL3: Japanese Unexamined Patent Application Publication No. 2005-72780

SUMMARY OF INVENTION

Technical Problem

However, it is considered that the techniques disclosed in Patent Literatures 1, 2 and 3 have the following problems.

First, it is not easy to align the optical axis of the camera toward the antenna reception direction with high accuracy. An alignment error needs to be 1.0° or less, and it is impossible to manually align the optical axis of the camera with the antenna reception direction at the antenna installation site. Accordingly, an antenna manufacturer needs to manufacture and sell an antenna device with an aligned camera attached; however, attaching the camera to each antenna results in a considerable increase in costs.

Second, such a camera needs to have a substantial zooming feature. A large optical device is required to take an image of the radio emitting source at a distance of several hundred meters or several kilometers. This also causes a considerable increase in costs.

Third, there is a problem that the radio emitting direction from the radio emitting source is not always vertical to the antenna plane of the radio emitting source. When the radio emitting direction is deviated even slightly from the antenna plane, even if the antenna orientation is adjusted at the correct direction to the antenna plane of the radio emitting source, it is not necessarily the orientation where the maximum reception level is achieved.

An exemplary object of the present invention is to provide a device that can assists in adjusting the orientation of an antenna with high accuracy in a simple and inexpensive structure.

Solution to Problem

An antenna orientation adjustment assistance device according to an exemplary aspect of the present invention includes a reception strength detection unit for detecting a reception strength of radio waves received by an antenna unit, a position calculation unit for calculating a relative angle position of the antenna unit by using an image taken by a camera fixed relative to the antenna unit, and a reception strength recording unit for recording the relative angle position of the antenna unit and the reception strength at the relative angle position in association with each other.

An antenna orientation adjustment assistance program according to an exemplary aspect of the present invention causes a computer to function as a reception strength detection unit for detecting a reception strength of radio waves received by an antenna unit, a position calculation unit for calculating a relative angle position of the antenna unit by using an image taken by a camera fixed relative to the antenna unit, and a reception strength recording unit for recording the relative angle position of the antenna unit and the reception strength at the relative angle position in association with each other.

A nonvolatile recording medium according to an exemplary aspect of the present invention stores the antenna orientation adjustment assistance program in a computer-readable manner.

An antenna device installation method according to an exemplary aspect of the present invention includes a step of temporarily installing an antenna device, a step of mounting a camera on the antenna device so that a position and an orientation are not displaced relative to an antenna unit of the antenna device, a position calculation step of calculating a relative angle position of the antenna unit by using an image taken by the camera, a reception strength detection step of detecting a reception strength of radio waves received by the antenna unit, and a reception strength recording step of recording the relative angle position of the antenna unit and the reception strength at the relative angle position in association with each other, wherein the position calculation step, the reception strength detection step and the reception strength recording step are repeated by changing an orientation of the antenna unit.

Advantageous Effects of Invention

According to the exemplary aspects of the present invention, any worker can quickly and accurately install an antenna device.

DESCRIPTION OF EMBODIMENTS

Figure 1:
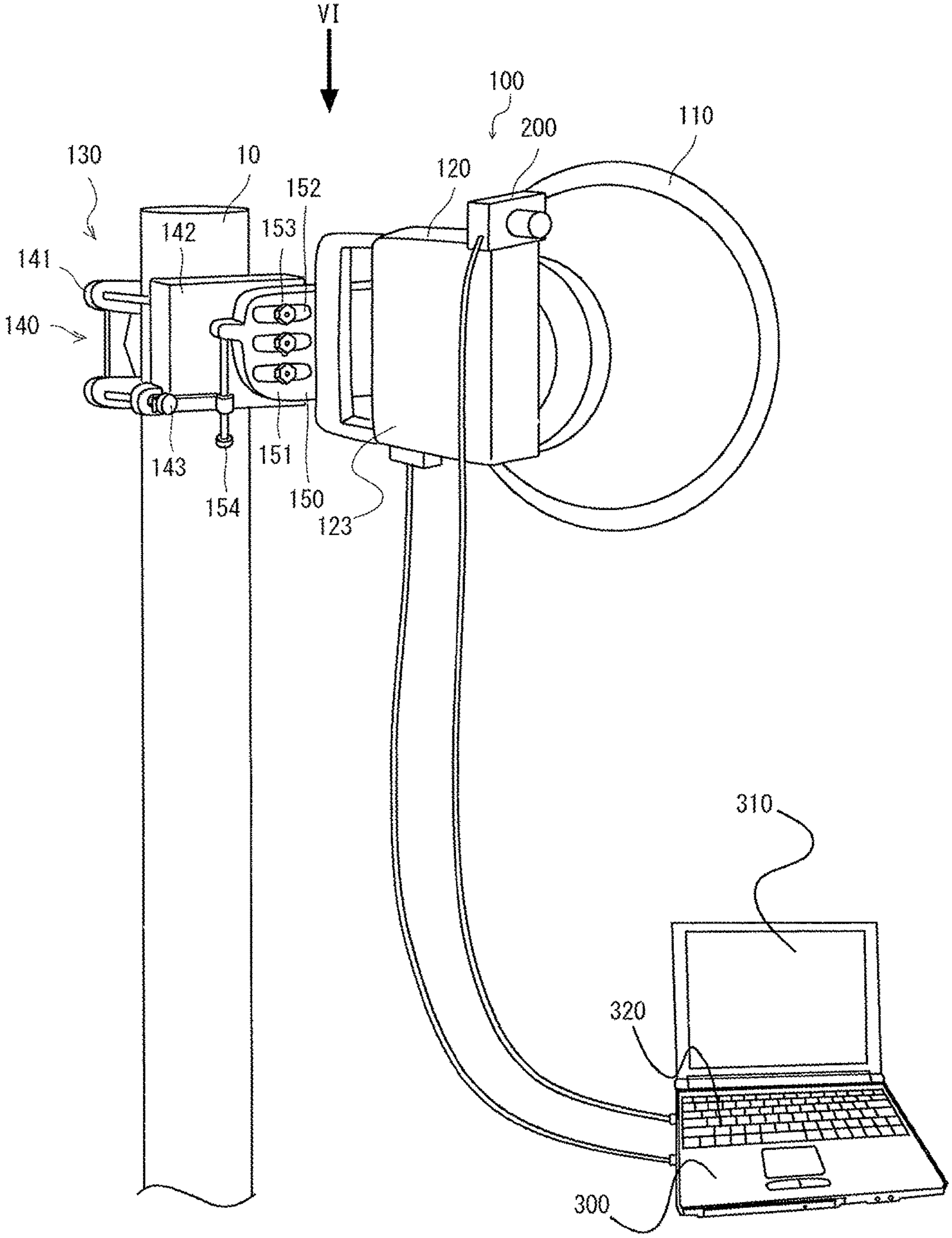
FIG. 1 is a view showing the installation work of an antenna device according to a first exemplary embodiment.

Exemplary embodiments of the present invention are illustrated in the drawings and described hereinafter by referring to the reference symbols of elements in the drawings.

(First Exemplary Embodiment)

A first exemplary embodiment of the invention is described hereinafter.

FIG. 1 is a view showing the installation work of an antenna device 100 according to this exemplary embodiment. A known antenna device can be used. Although a so-called parabolic antenna is shown as an example, the type of the antenna is not particularly limited in the application of this exemplary embodiment.

The structure of an antenna device 100, though it is already known, is briefly described hereinafter.

FIG. 1 shows the antenna device 100 mounted on a mast 10 and viewed from the back.

The antenna device 100 includes an antenna unit 110, a transmitting and receiving unit 120, and a mounting means 130.

The transmitting and receiving unit 120 is an electrical circuit unit that includes a receiving circuit 121 and a transmitting circuit 122 (see FIG. 3) and performs modulation and demodulation of signals according to the need.

The transmitting and receiving unit 120 includes a storage box 123 that serves as a housing and electrical circuit units (121, 122) stored in the storage box 123, and it is coupled to the backside of the antenna unit 110. The backside of the antenna unit 110 and the transmitting and receiving unit 120 are coupled by a coupling mechanism (not shown), though not illustrated in detail.

The mounting means 130 installs and fixes the antenna unit 110 and the transmitting and receiving unit 120.

The case where the mounting means 130 fixes the antenna unit 110 and the transmitting and receiving unit 120 to the mast 10 is shown as an example.

The mounting means 130 includes a clamp means 140 and an elevation adjustment fitting 150.

The clamp means 140 includes a holding member 141 and a receiving member 142 that holds the mast 10 tight on both sides. The both members are coupled by a fastening bolt 143. When the holding member 141 and the receiving member 142 hold the mast 10 tight on both sides, the orientation (azimuth) of the antenna unit 110 can be adjusted by adjusting the orientation (azimuth) of the receiving member 142. Further, by adjusting the gap between the holding member 141 and the receiving member 142 by turning the fastening bolt 143, the orientation (azimuth) of the antenna unit 110 can be adjusted about the mast 10 as the center of rotation.

The elevation adjustment fitting 150 couples the antenna unit 110 and the transmitting and receiving unit 120 to the clamp means 140, allowing adjustment of the elevation of the antenna unit 110. The elevation adjustment fitting 150 is fixed to the receiving member 142 on its base end side (151) and fixed to the backside of the antenna unit 110 on its leading end side. (Note that, in FIG. 1, the leading end side of the elevation adjustment fitting 150 is hidden behind the storage box 123.)

The base end side (151) of the elevation adjustment fitting 150 has several long holes 152, and the elevation adjustment fitting 150 is secured to the receiving member 142 by mounting screws 153 that are inserted through the long holes 152.

The base end 151 of the elevation adjustment fitting 150 is provided with an adjusting screw 154 that hangs down substantially vertically, and the adjusting screw 154 is screwed also to the receiving member 142. By turning to move the adjusting screw 154 forward or backward, the base end 151 of the elevation adjustment fitting 150 rotates relative to the receiving member 142 about the mounting screw 153 as an axis. Thus, the elevation of the antenna unit 110 can be adjusted by turning the adjusting screw 154.

An antenna orientation adjustment assistance system according to this exemplary embodiment is described hereinbelow.

The hardware configuration of the antenna orientation adjustment assistance system at least includes a camera 200 and a PC (Personal Computer) 300 as shown in FIG. 1.

The camera 200 may be a digital camera or a portable terminal (for example, a mobile phone) with a camera function. In FIG. 1, the camera 200 is mounted on the back of the antenna unit 110, and the direction in which the lens of the camera 200 takes an image has no relation with the direction in which the antenna device 100 receives radio waves. Like in this example, the direction in which the camera 200 takes an image is arbitrary.

Note that, however, as will be apparent from the following description, an object whose position is set (fixed) needs be within an imaging region. In other words, an imaging direction to merely take a sky image, for example, is of no use. It is preferred that a construct such as a building or a house, for example, appears in the image. Further, if possible, it is more preferred that an object with a clear color, shape or the like appears in the image. A worker who installs the antenna device 100 looks over the surroundings and roughly determines the orientation of the camera 200 so that the above-described construct appears in the image. Then, the worker fixedly mounts the camera 200 on an appropriate position of the antenna device 100.

In the case of mounting the camera 200 on the top surface of the storage box 123 as shown in FIG. 1, the easiest way is to attach the camera 200 to the storage box 123 using a double-stick tape. Note that, however, even when the easiest way is employed, it is necessary that the positions and orientations of the antenna unit 110 and the camera 200 are not displaced relative to each other. Stated differently, if the position or orientation of the antenna unit 110 changes, the position or orientation of the camera 200 should change in the same way.

Figure 2:
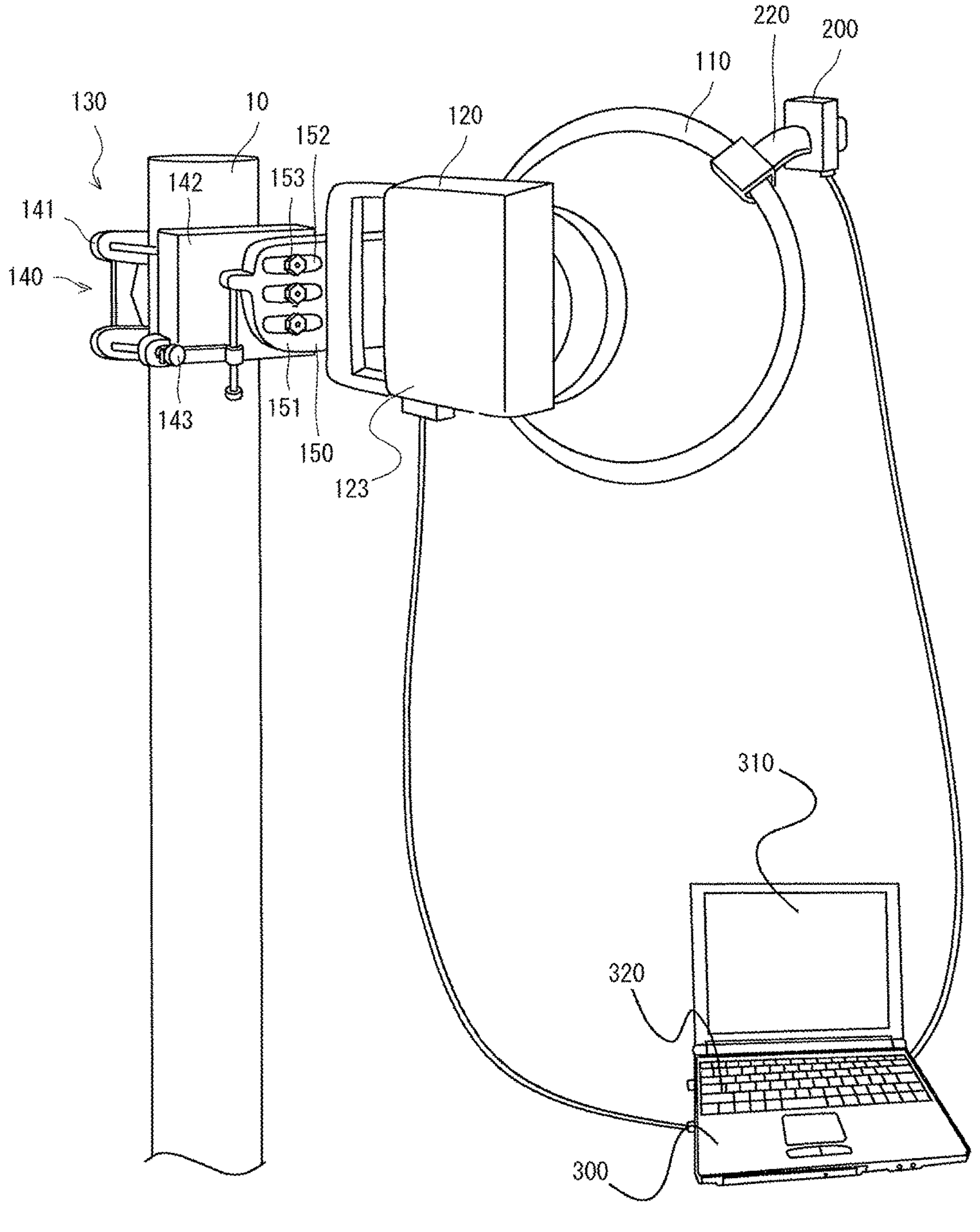
FIG. 2 is a view showing the case where a camera is fixed to an antenna unit using a mounting jig.

FIG. 2 shows, for reference, the case where the camera 200 is fixed to the antenna unit 110 using a given mounting jig 220. Like in this example, the camera 200 can face the same direction as the reception direction of the antenna unit 110 as a matter of course.

The PC 300 may be any computer as long as it includes a memory and a CPU and can implement specified processing functions by loading a program, and it may be a portable small computer, for example.

For example, the PC 300 may be a notebook PC. Although it is called by various names such as a notebook computer, a laptop, a palmtop and an Ultrabook, such a difference in name is nothing to do with the gist of the present invention as a matter of course. Further, the PC 300 may be a recent tablet terminal, smartphone or the like.

Figure 3:
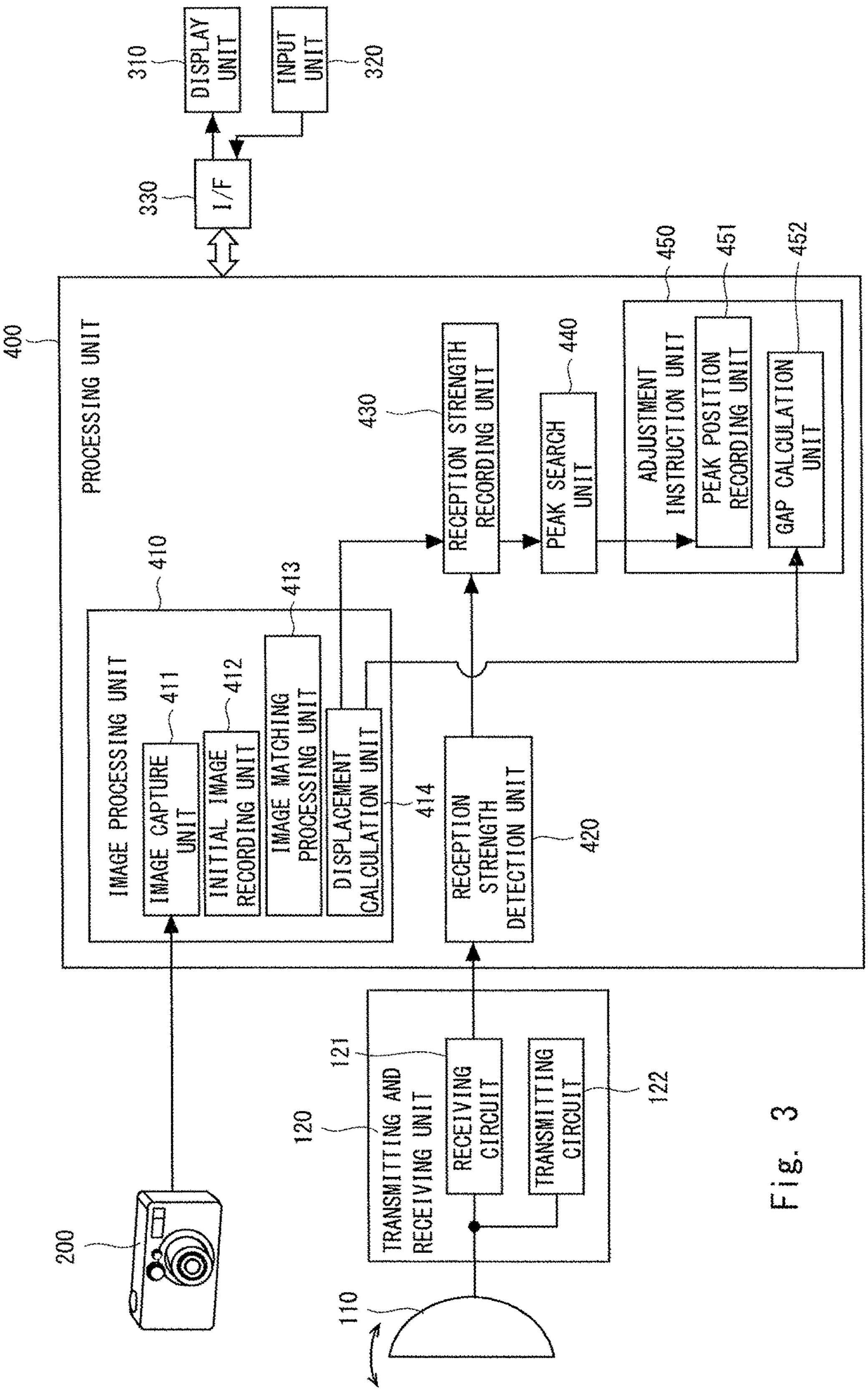
FIG. 3 is a functional block diagram of an antenna orientation adjustment assistance system.

FIG. 3 is a functional block diagram of the antenna orientation adjustment assistance system.

In FIG. 3, a processing unit 400 is a functional unit that is implemented when a CPU of the PC 300 loads a program.

The processing unit 400 includes an image processing unit 410, a reception strength detection unit 420, a reception strength recording unit 430, a peak search unit 440, and an adjustment instruction unit 450.

Further, the image processing unit 410 includes an image capture unit 411, an initial image recording unit 412, an image matching processing unit 413, and a displacement calculation unit (position calculation unit) 414.

The adjustment instruction unit 450 includes a peak position recording unit 451 and a gap calculation unit 452.

The detailed operation of each functional unit is described later with reference to the flowchart and the illustration.

Figure 4:
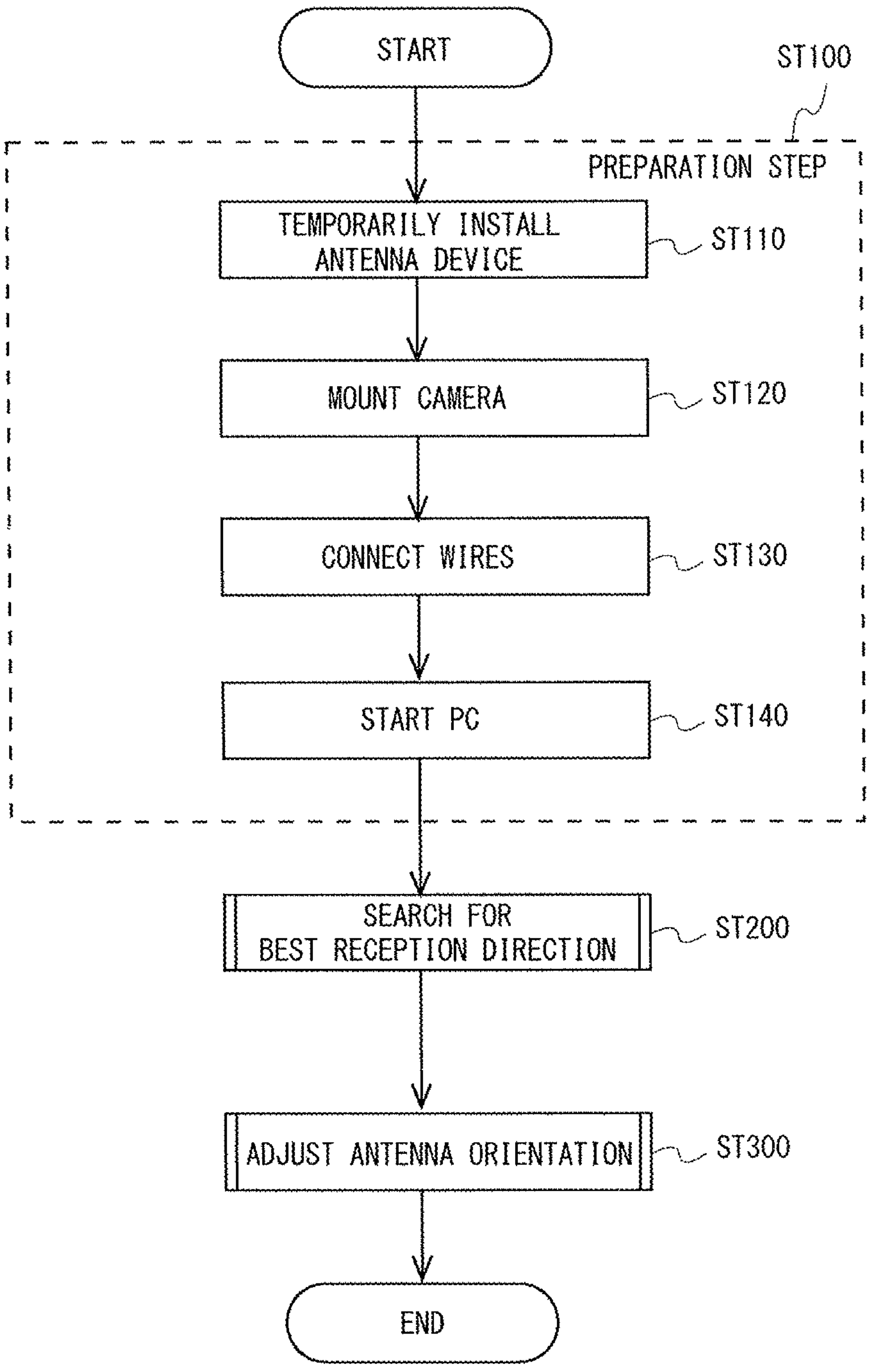
FIG. 4 is a flowchart showing a procedure of adjusting the orientation of the antenna unit to the most appropriate direction.

FIG. 4 is a flowchart showing a procedure of adjusting the antenna orientation to the most appropriate direction.

The antenna orientation adjustment method broadly includes a preparation step (ST100), a step of searching for the best reception direction (ST200) and a step of adjusting the antenna orientation (ST300).

Each step is described hereinbelow.

The preparation step (ST100) includes a step of temporarily installing the antenna device 100 (ST110), a step of mounting the camera 200 on the antenna device 100 (ST120), a step of wiring (ST130), and a step of starting the PC 300 (ST140).

The step of temporarily installing the antenna device 100 (ST110) is a step of installing the antenna device 100 at a specified installation place using the mounting means 130 as already shown in FIG. 1.

In this step, the orientation of the antenna unit 110 may be adjusted roughly to a certain azimuth and elevation. For example, the orientation of the antenna unit 110 may be set toward an opposite station using a compass (an azimuth magnet), or the orientation of the antenna unit 110 may be set to an opposite station after identifying the opposite station using a telescope.

Note that, although fine adjustment will be made later (ST300), because it makes the fine adjustment difficult if there is a gap of as large as 10° or 20°, the gap is preferably within the range of about 5°, front and back, for example, with respect to the direction that is assumed to be the best.

The step of mounting the camera 200 (ST120) is also as described earlier with reference to FIG. 1. A worker looks over the surroundings and roughly determines the orientation of the camera 200 so that a construct appears in the image if possible, and then fixedly mounts the camera 200 on an appropriate position of the antenna device 100.

Then, wires are connected to the PC 300. Specifically, the camera 200 and the PC 300 are connected first. Then, wiring is done so that the reception level of the antenna device 100 can be detected by the PC 300. To be specific, the receiving circuit 121 of the transmitting and receiving unit 120 is connected to the PC 300.

Although an example where the camera 200 and the antenna device 100 are connected to the PC 300 by wire is shown in FIG. 1, they may be connected wirelessly.

After wiring is done, the PC 300 is started (ST140), and a specified program (antenna orientation adjustment assistance program) is loaded. The preparation step (ST100) thereby ends.

Next, the step of searching for the best reception direction (ST200) is described.

Figure 5:
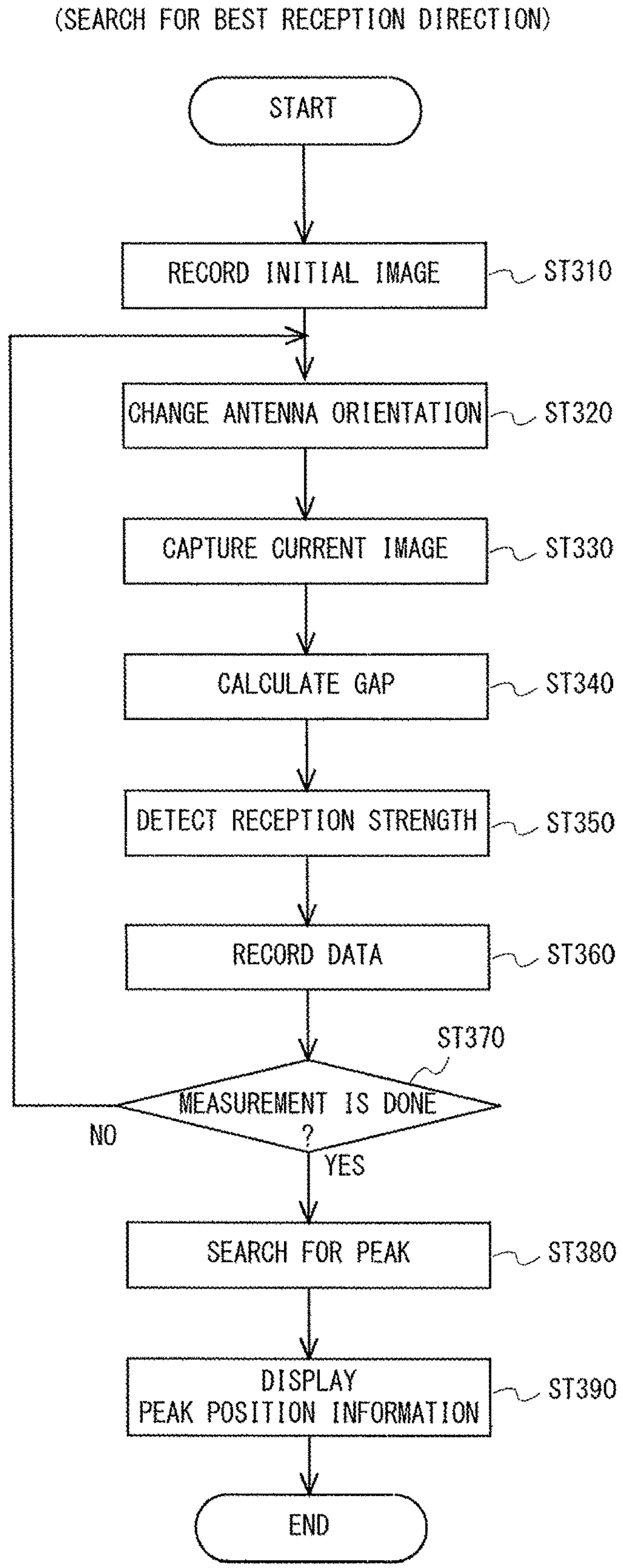
FIG. 5 is a flowchart showing a detailed procedure of a step of searching for the best reception direction.

FIG. 5 is a flowchart showing a detailed procedure of the step of searching for the best reception direction (ST200).

Figure 6:
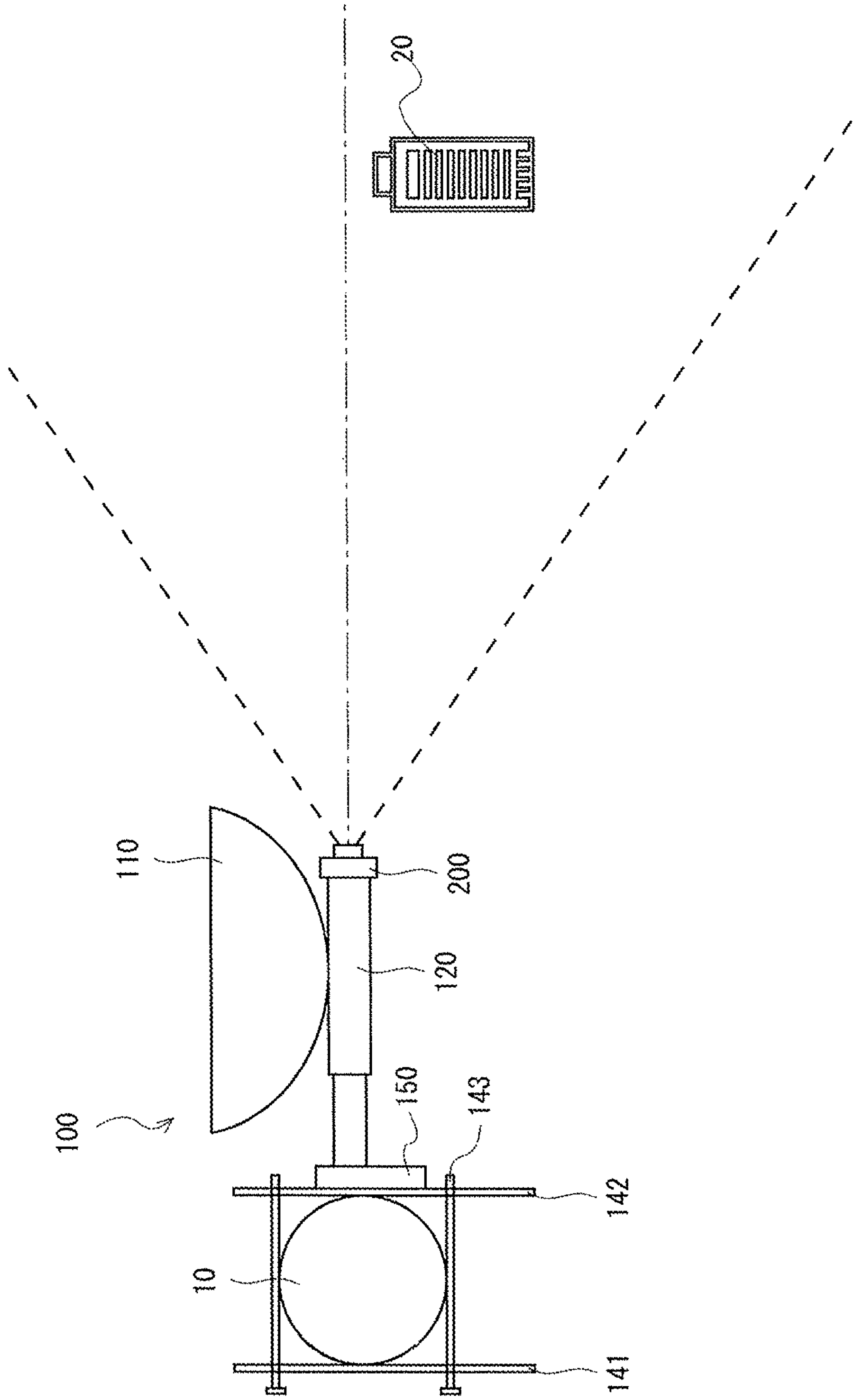
FIG. 6 is a view showing the antenna device viewed from above.

The first to be performed is the capture of an initial image. The camera 200 is already mounted on the antenna device 100, and a worker captures the current image in the camera 200 as an initial image (ST310). FIG. 6 is a view showing the antenna device 100 viewed from above.

(Stated differently, FIG. 6 is a view showing the antenna device 100 viewed from the direction of the arrow VI in FIG. 1.)

In FIG. 6, the imaging range of the camera 200 is indicated by the dotted line. (Note that the alternate long and short dashed line indicates the center line of the imaging range.)

Figure 7:
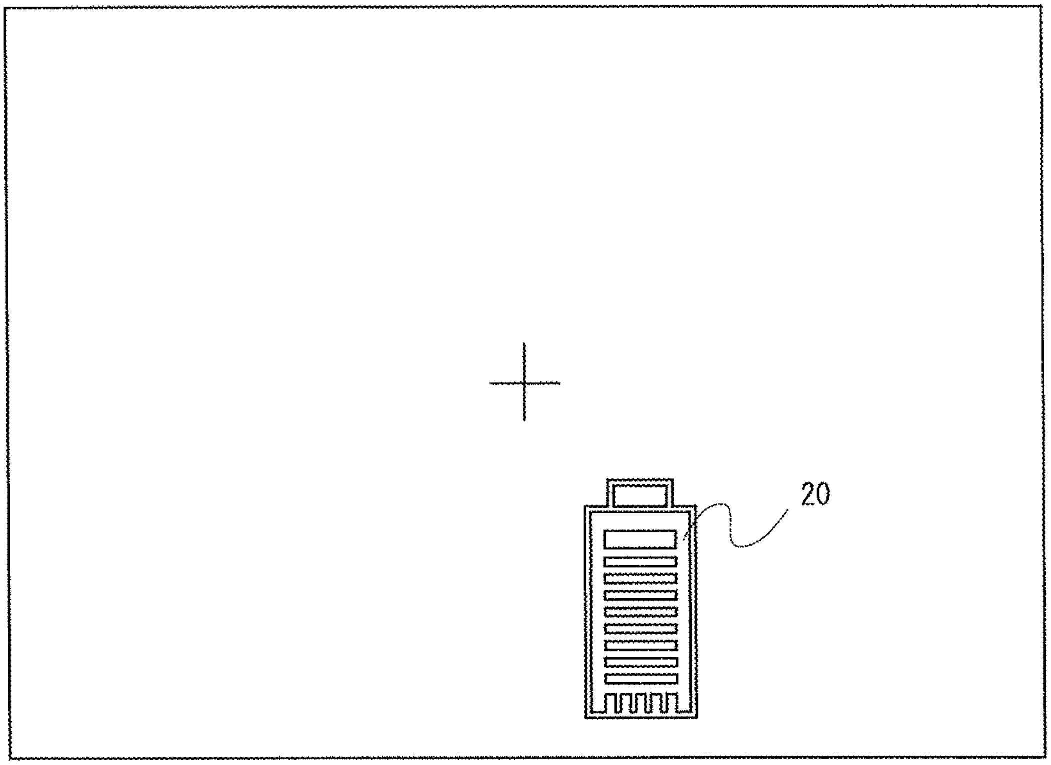
FIG. 7 is a view showing an example of a captured image.

In the example of FIG. 6, it is assumed that a building 20 stands near the center of the imaging range of the camera 200. Accordingly, the building 20 appears near the center in the camera image as shown in FIG. 7. The camera image is displayed on a display unit 310 of the PC 300 through the image capture unit 411.

Figure 8:
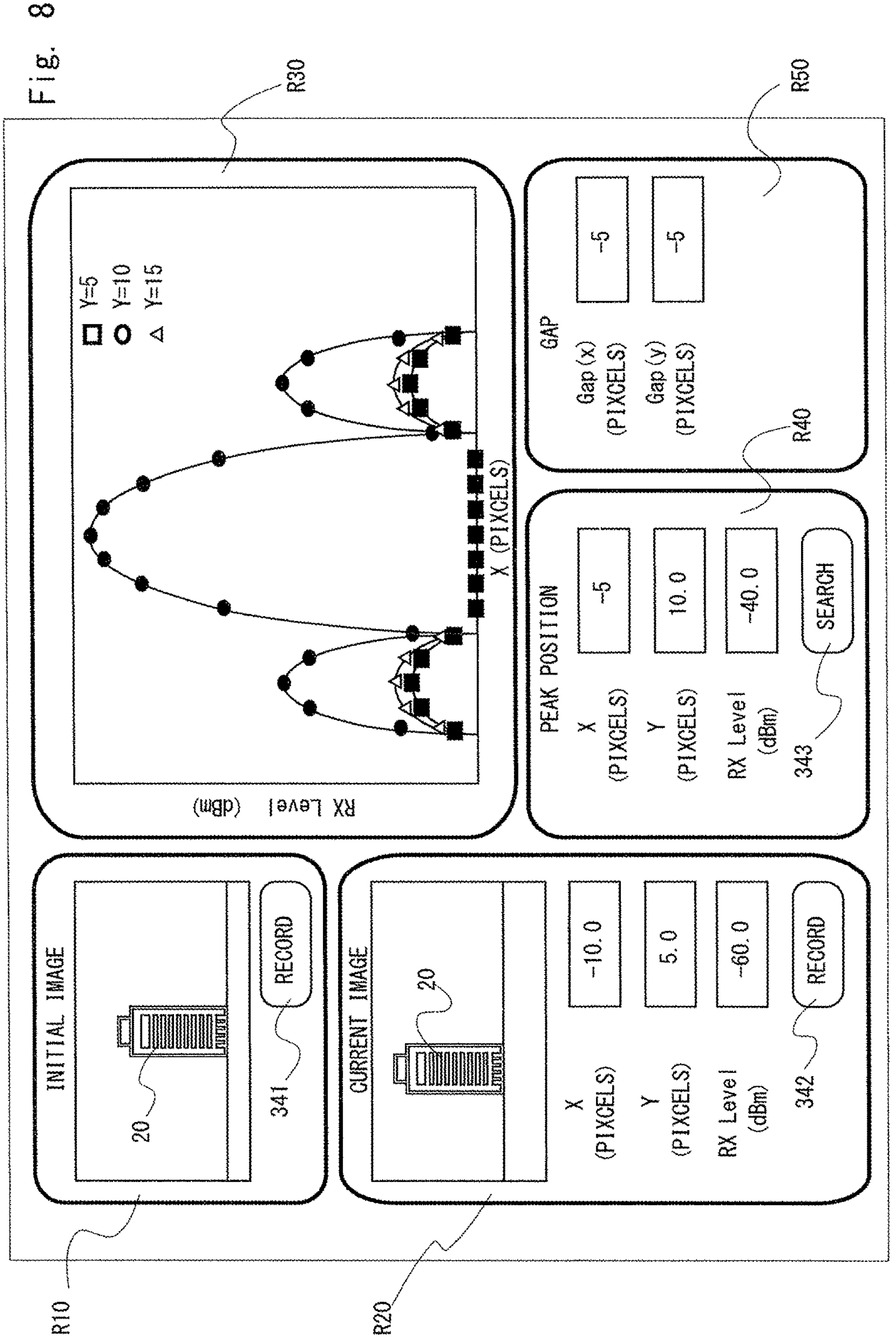
FIG. 8 is a view showing an example of a display screen.

FIG. 8 is a view showing an example of a display screen. The display screen is largely divided into four regions, and the upper left region is an initial image display region R10 that displays the initial image. A worker views the image displayed in the initial image display region R10 and recognizes that an object (20) that can serve as a landmark appears in the image and then presses a record button 341 below the image.

(The worker may click on the record button 341 by moving a pointer on the screen using a mouse or may directly press the record button 341 with a finger if the display unit 310 is a touch panel. Such a user interface may vary in design.)

The initial image is recorded and stored into the initial image recording unit 412.

After capturing the initial image (ST310), the worker conducts work to slightly change the orientation of the antenna unit 110 (ST320).

Figure 9:
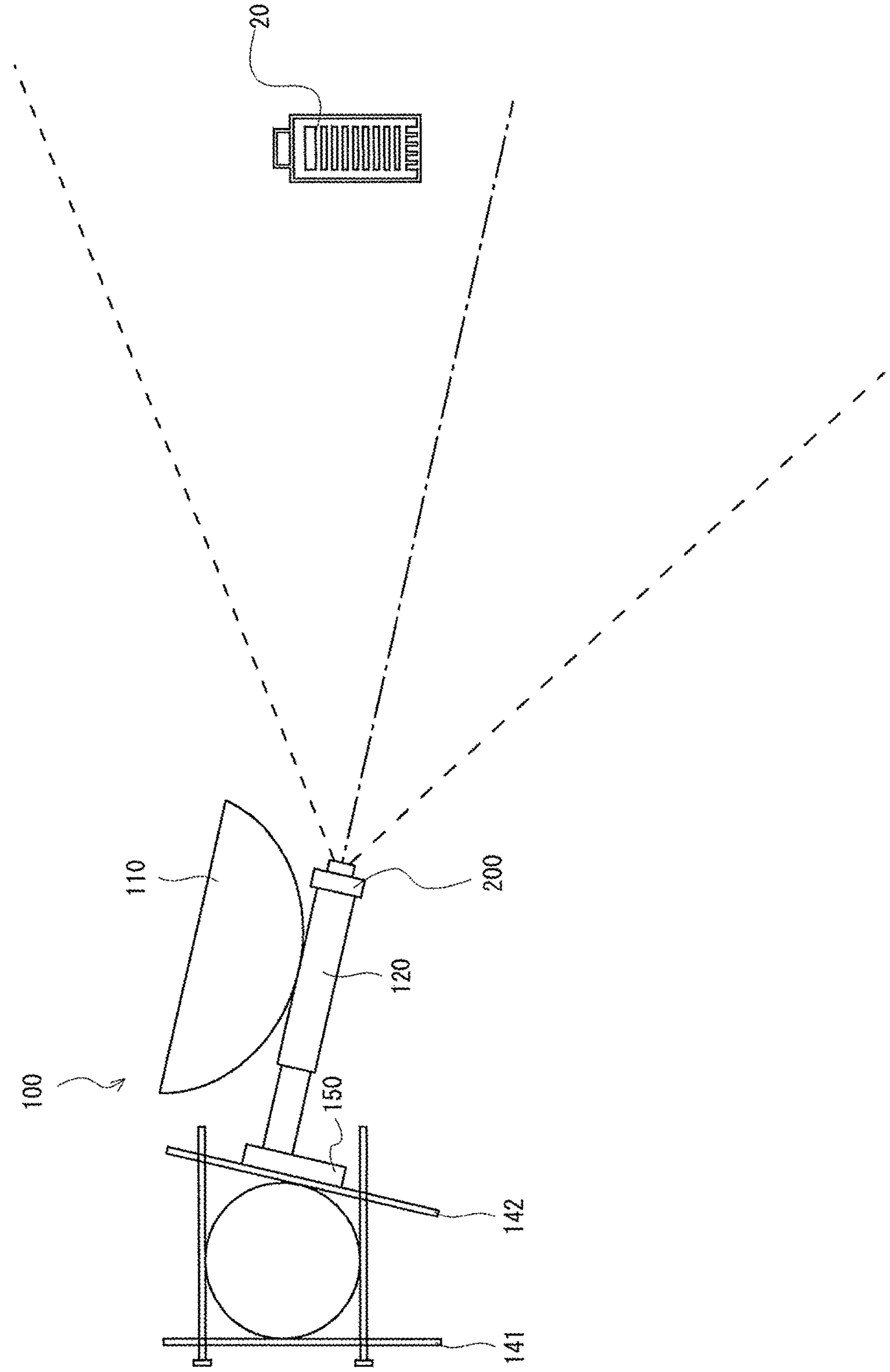
FIG. 9 is a view showing the state where the azimuth of the antenna unit is slightly shifted.

FIG. 9 is a view showing the state where the azimuth of the antenna unit 110 is slightly shifted.

(Although the azimuth is shifted about 10° in FIG. 9 to facilitate understanding for convenience of explanation, it is preferred in practice to shift the angle little by little.)

Figure 10:
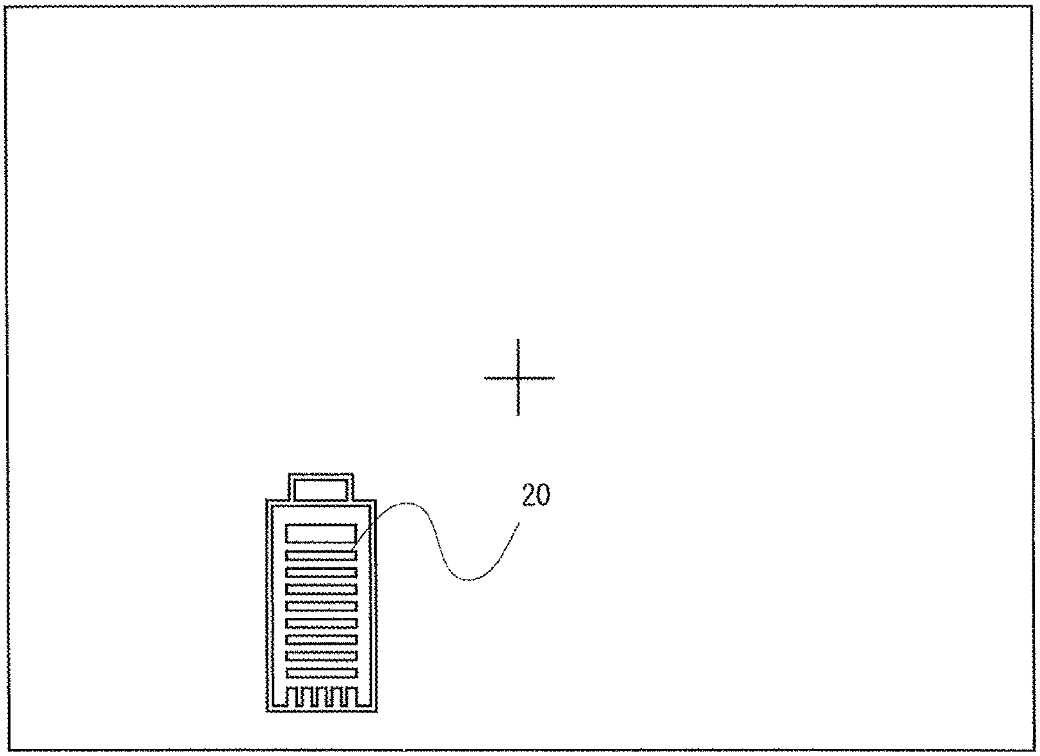
FIG. 10 is a view showing an example of a captured image.

Because the camera 200 is displaced integrally with the antenna unit 110, the azimuth of the camera 200 also changes in the same way as the antenna unit 110. Accordingly, the imaging direction of the camera 200 changes. As a result, it is assumed that the building 20 is displaced slightly to the left in the imaging region as shown in FIG. 10. In the display screen of FIG. 8, it is assumed that the region below the initial image display region R10 is a current image display region R20 that displays the current image. With the current image display region R20, the worker can view the image that is currently captured by the camera 200 in real time.

The image that is taken by the camera 200 after its orientation is changed is the current image. The current image is captured by the image capture unit 411 (ST330). Then, the image processing unit 410 compares the current image with the initial image and thereby calculates a gap between the current image and the initial image (ST340). Comparing two images and recognizing the images to see how much one is deviated from the other is an application of pattern matching and implemented by various methods. For example, Phase-Only Correlation is known.

Figure 11:
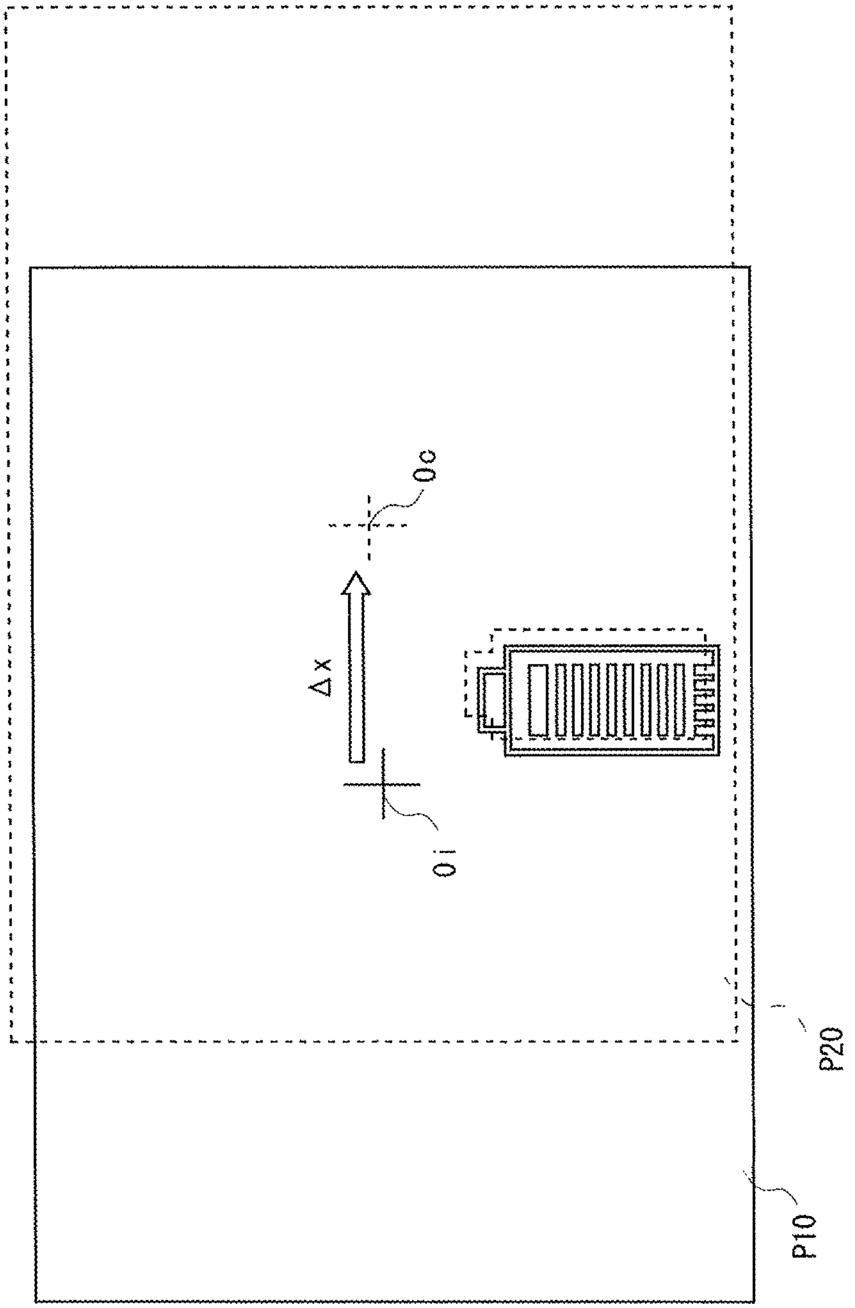
FIG. 11 is a view showing the state where a current image is superimposed on an initial image.

The image matching processing unit 413 compares the initial image P10 with the current image P20 and shifts the current image P20 so that the current image P20 matches the most with the initial image P10. FIG. 11 is a view showing the state where the current image P20 is superimposed on the initial image P10 so that they match. It is assumed that the building 20, which has appeared near the center in the initial image P10, appears leftward in the current image P20. In this case, it is found that the image center Oc of the current image P20 is displaced to the right relative to the image center Oi of the initial image P10.

The displacement calculation unit 414 calculates the gap between the current image P20 and the initial image P10 based on a result of matching by the image matching processing unit 413 (ST340).

In this example, it is calculated how many pixels are left as a gap.

Figure 12:
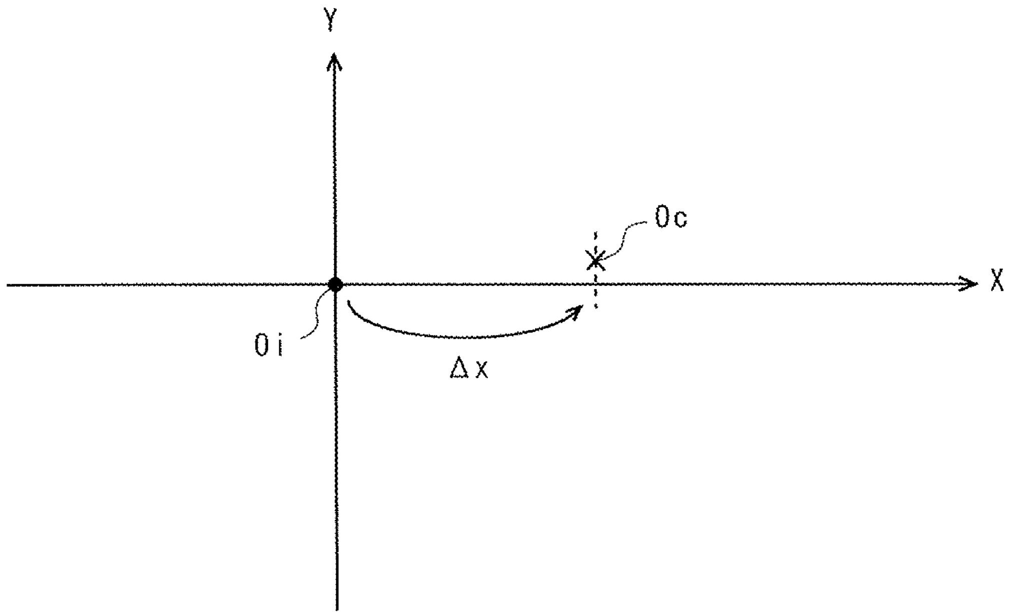
FIG. 12 is a view showing a gap between a current image and an initial image.

As shown in FIG. 12, it is assumed that the crosswise direction is the x-axis direction and the lengthwise direction is the y-axis direction in the display image. The displacement calculation unit 414 calculates the gap by calculating how many ($\Delta X$) pixels in the x-direction and how many ($\Delta Y$) pixels in the y-direction the current image P20 is deviated from the initial image P10.

The calculated gaps ($\Delta X$, $\Delta Y$) are displayed on the display screen. It is assumed that the gaps in the x-direction and in the y-direction are displayed below the current image display region R20 (see FIG. 8). In this example, despite that the worker has intended to shift the azimuth (x-direction) only, the elevation (y-direction) has also been shifted slightly. In this manner, the image matching can detect a slight gap that cannot be recognized by the feeling of a finger or visual inspection of the worker.

As is understood from FIG. 11 or 12, when the center Oi of the initial image P10 is the origin of the coordinate system, the coordinates of the center Oc of the current image P20 is represented as ($\Delta X$, $\Delta Y$). Accordingly, in this specification, the coordinates ($\Delta X$, $\Delta Y$) are referred to as the position of the current image P20 in some cases. Further, as described earlier, the positions and orientations of the antenna unit 110 and the camera 200 are fixed relative to each other. In other words, the orientation of the antenna unit 110 and the image taken by the camera 200 at the same orientation of the antenna unit 110 are in one-to-one correspondence. Accordingly, in this specification, the coordinates ($\Delta X$, $\Delta Y$) are referred to as the position of the antenna unit, equating the orientation (angle) of the antenna unit 110 with the position ($\Delta X$, $\Delta Y$) of the image in some cases.

(Thus, the displacement calculation unit 414 is referred to as a position calculation unit in some cases.)

After the position of the current image P20 is calculated in this way, the reception strength is detected (ST350). Specifically, the strength of the signal that can be received in the current orientation of the antenna unit 110 is detected. The electric wave signal received by the antenna unit 110 is transmitted to the reception strength detection unit 420 through the transmitting and receiving unit 120 (the receiving circuit 121). The reception strength detection unit 420 obtains the input signal level. The reception strength obtained in this manner is displayed on the display screen.

It is assumed in this example that the display region of the reception strength, together with the gap, is placed below the current image display region R20.

The worker sees the position of the current image P20 and that the reception level at the position is obtained and then presses the record button 342. Then, the position of the current image P20 and the reception level at this time are recorded as a pair (ST360). Specifically, when the worker presses the record button 342, the position of the current image P20 calculated by the displacement calculation unit 414 and the reception strength detected by the reception strength detection unit 420 are transmitted to the reception strength recording unit 430. The reception strength recording unit 430 records the position of the current image P20 and the reception strength as a pair.

Further, after the position of the current image P20 and the reception strength are recorded, they are displayed as a graph on the display screen. It is assumed in this example that the upper right region of the display screen is a graph display region R30.

The worker repeats the steps from changing the antenna orientation (ST320) to recording the data (ST360) by changing the orientation of the antenna unit 110 little by little.

Figure 13:
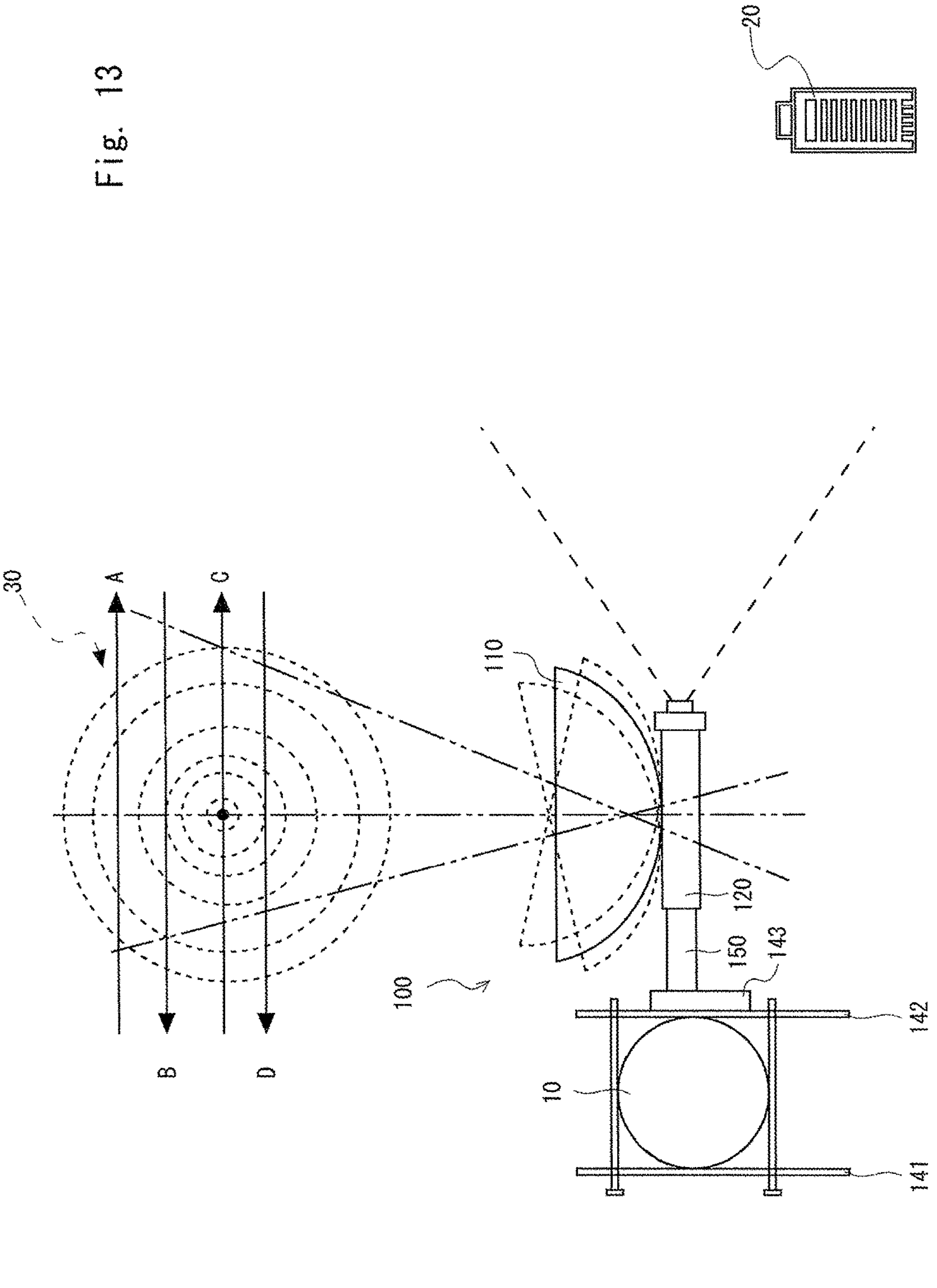
FIG. 13 is a view showing an example of radio emission patterns from an opposite antenna and a step-by-step change of the antenna orientation in accordance with those patterns.

FIG. 13 shows an example of the reception antenna pattern 30 and a step-by-step change of the antenna orientation. In the case where the antenna unit 110 is a parabolic antenna, the reception antenna pattern 30 is a concentric circle. As the frequency of radio waves is higher, the orientation of the antenna unit 110 should be set toward the opposite station so as to align a point with a point.

The worker tries to change the orientation of the antenna unit 110 in various ways toward the rough direction from which radio waves are expected to come.

For example, as indicated by the arrow A, the elevation is fixed to a certain value, and only the azimuth is shifted from left to right.

Next, as indicated by the arrow B, the elevation is changed to a little smaller value, and only the azimuth is shifted from right to left.

Repeating this process, the orientation of the antenna unit 110 is changed as indicated by the arrow C and the arrow D.

By this operation, the graph indicating the relationship between the position of the antenna unit 110 and the reception strength is obtained.

Figure 14A:
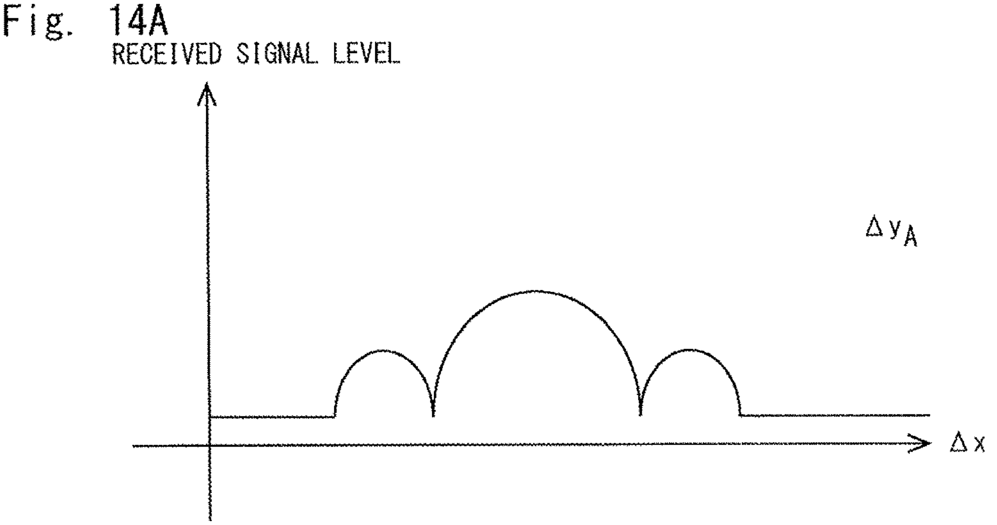
FIG. 14A is a graph showing a change in reception strength with a change in the orientation of the antenna unit.

FIG. 14A is a graph showing a change in reception strength with a change in the orientation of the antenna unit 110 along the arrow A.

In FIG. 14A, the vertical axis is the reception level, and the horizontal axis is the azimuth. Note that the azimuth is represented by the value of ΔX. Further, because the elevation corresponds to Δy, FIG. 14A is labeled $\Delta Y_A$ on the right. Likewise, FIG. 14B is the graph corresponding to the arrow B, and FIG. 14C is the graph corresponding to the arrow C.

The reception strength reaches its peak when going through the center of the emission pattern as indicated by the arrow C.

Figure 14B:
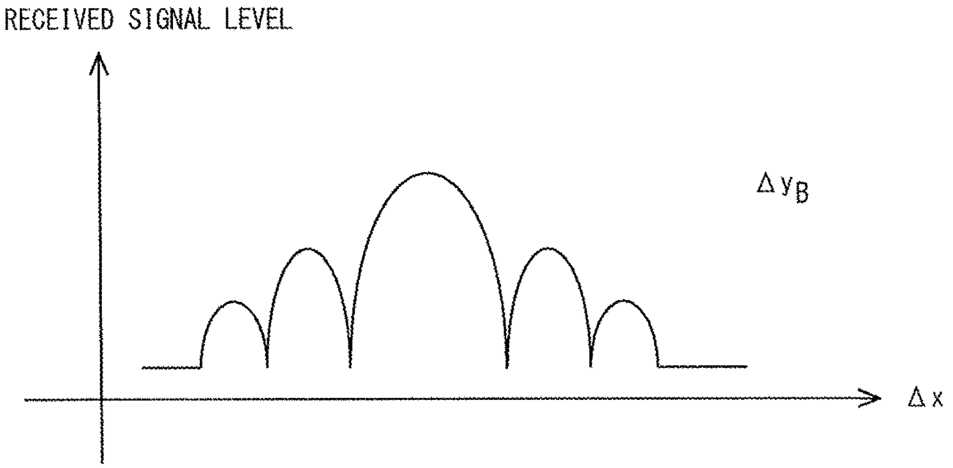
FIG. 14B is a graph showing a change in reception strength with a change in the orientation of the antenna unit.
Figure 14C:
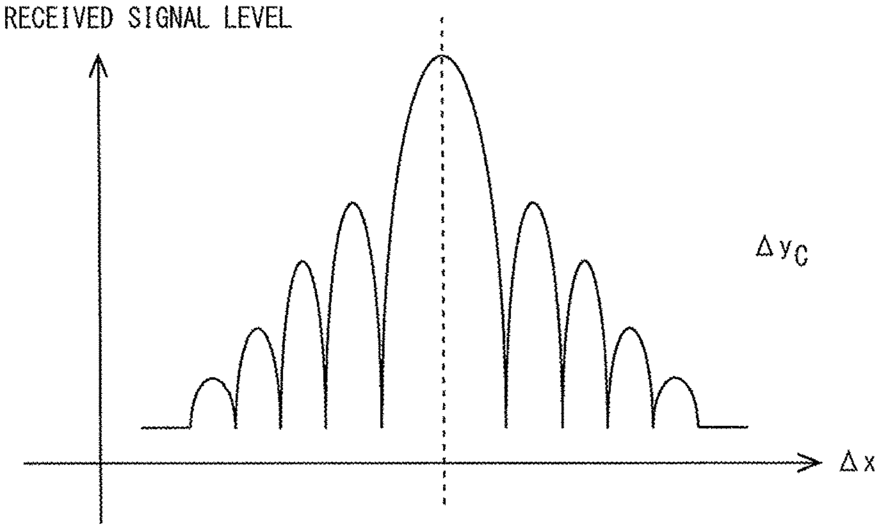
FIG. 14C is a graph showing a change in reception strength with a change in the orientation of the antenna unit.

The graphs of FIGS. 14A, 14B and 14C are displayed in the graph display region R30 of the display screen as shown in FIG. 8. The worker shifts the orientation of the antenna unit 110 uniformly toward the rough direction from which radio waves are expected to come and further determines whether necessary measurements are done, viewing the graphs displayed in the graph display region R30 (ST370). To be specific, it can be determined that necessary measurements are done if the peak in FIG. 14C is obtained as a measurement value (ST370).

When it is determined that necessary measurements are done (YES in ST370), the peak position is searched for (ST380).

The worker presses the search button 343 on the display screen. Then, the peak search unit 440 searches for the maximum value of the reception strength among the data recorded in the reception strength recording unit 430. The peak search unit 440 finds the maximum value of the reception strength by search and further reads the position of the antenna unit 110 at which the maximum value of the reception strength is achieved.

(As described earlier, the position of the antenna unit 110 and the reception strength are recorded as a pair in the reception strength recording unit 430.)

The maximum value of the reception strength and the position (ΔX, ΔY) of the antenna unit 110 at this time are displayed in a maximum reception direction display region R40 (ST390). As shown in FIG. 8, the reception direction display region R40 is placed in the lower middle part of the display screen. In the following description, the position of the antenna unit 110 at which the maximum value of the reception strength is achieved is referred to as "peak position" in some cases. The peak position calculated by the peak search unit 440 is recorded in the peak position recording unit 451.

After the orientation (position) of the antenna unit 110 at which the maximum value of the reception strength is achieved is obtained, the step of searching for the best reception direction (ST200) ends. Then, the process proceeds to the step of adjusting the orientation of the antenna unit 110 (ST300).

The step of adjusting the orientation of the antenna unit 110 (ST300) is described hereinafter.

The position (peak position) of the antenna unit 110 at which the maximum value of the reception strength is achieved is already obtained in the step of searching for the best reception direction (ST200), and, in this step of adjusting the orientation of the antenna unit 110 (ST300), the worker makes adjustment to set the orientation of the antenna unit 110 at the peak position.

Figure 15:
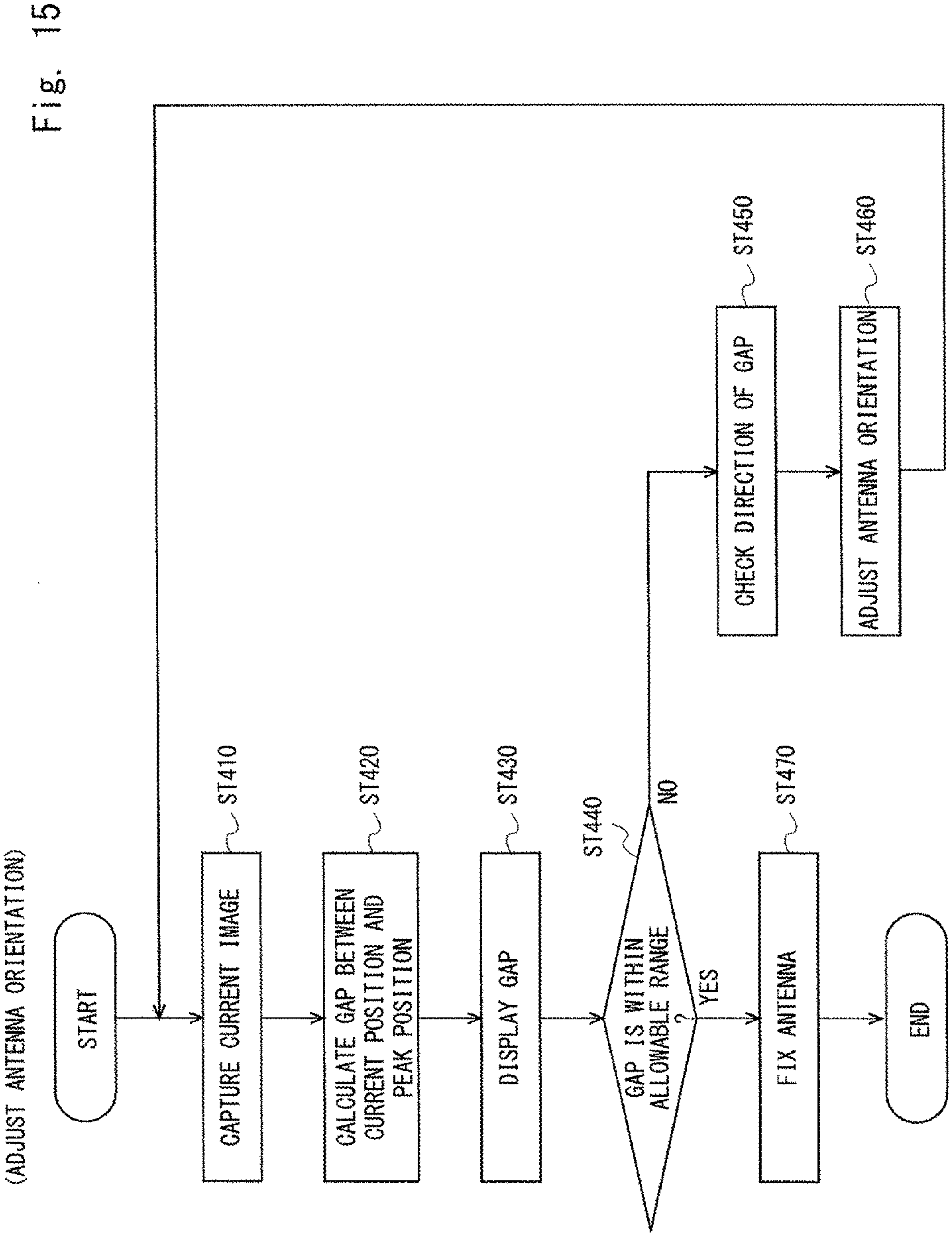
FIG. 15 is a detailed flowchart of a step of adjusting the orientation of the antenna unit.

FIG. 15 is a detailed flowchart of the step of adjusting the orientation of the antenna unit 110 (ST300).

The worker captures the current image (ST410). Specifically, in order to identify the current antenna position, the image that is currently taken by the camera 200 is acquired. Then, a gap between the initial image and the current image is calculated by the image matching processing unit 413 and the displacement calculation unit 414 (ST420) and displayed together with the current image in the current image display region R20.

Figure 16:
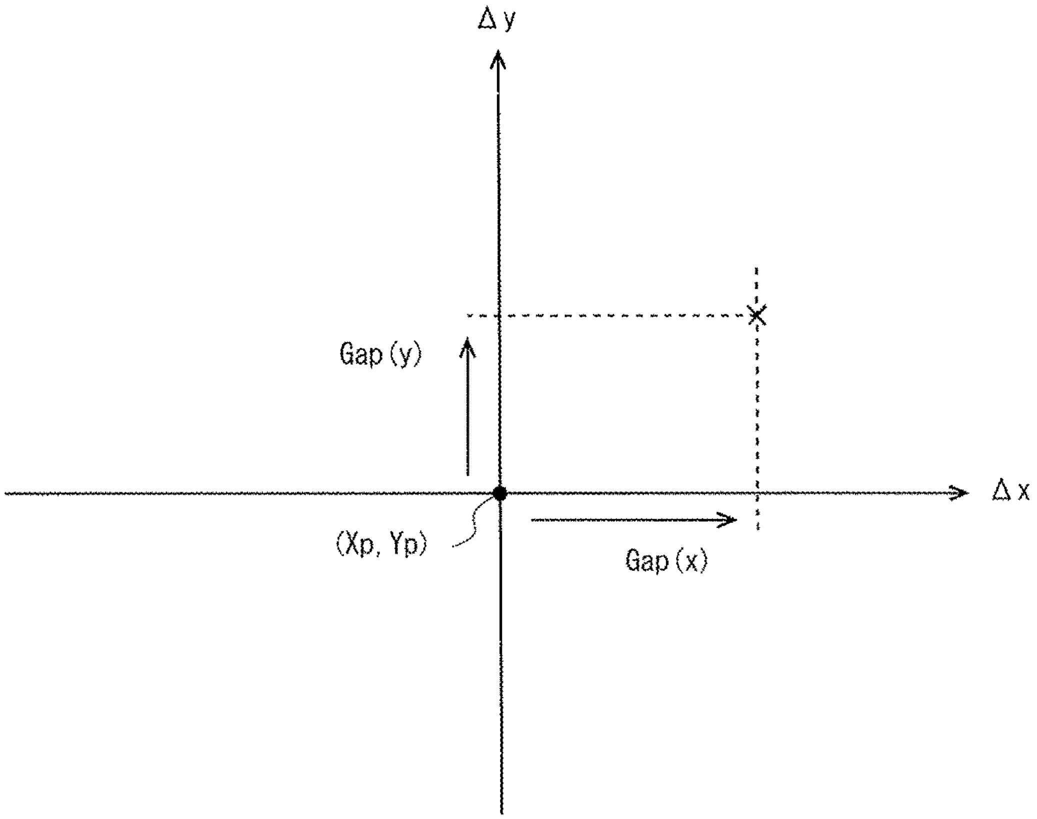
FIG. 16 is a view showing a gap between a current position and a peak position.

Further, the position (ΔX, ΔY) of the current image is transmitted to the gap calculation unit 452. The gap calculation unit 452 calculates how much the current image is deviated when the peak position is the origin. FIG. 16 shows this calculation. In FIG. 16, the peak position is (ΔXp, ΔYp), which is set as the origin. Then, a gap between the position (ΔX, ΔY) of the current image and the origin is represented as (Gap(x), Gap(y)). The gap (Gap(x), Gap(y)) calculated in this manner is displayed in a gap display region R50 of the display screen (ST430). It is assumed in this example that the gap display region R50 is placed on the right of the maximum reception direction display region R40.

The worker sees the displayed gap and determines whether the gap is within the allowable range (ST440). In this determination, the worker sees not only the value of the gap (Gap(x), Gap(y)) but also how low the current reception strength is from the peak value. Because the amount of gap that is determined from the image differs depending on the distance from the camera 200 to the object, for example, it is not preferred to use only the gap as an index.

(A gap for the camera angle 1° differs depending on the distance from the camera 200 to the object.)

When the gap is outside the allowable range (NO in ST440), the worker checks the rough amount and the direction of gap by seeing the gap display region R50

(ST450) and adjusts so that the orientation of the antenna unit 110 is at the peak position (ST460). Then, the worker evaluates how much the position of the antenna unit 110 after adjustment is deviated from the peak position (ST440) again and, when determines that the gap is within the allowable range (YES in ST440), the worker fixes the antenna device at that position (azimuth and elevation) (ST470). It is thereby possible to adjust the antenna unit at the orientation where the maximum reception level is achieved. Finally, the camera 200 and the PC 300 are removed from the antenna device 100.

According to the first exemplary embodiment with the above-described structure, the following advantageous effects can be obtained.

(1) In the first exemplary embodiment, a useful index (mark) is provided to a worker when adjusting the orientation of the antenna unit 110 toward the direction where the maximum reception level is achieved.

In the existing system, the orientation of the antenna unit 110 is adjusted by a trial-and-error method relying on guesswork, such as seeking the direction where the maximum reception level is achieved by trial and error or repeating fine adjustment in a step-by-step manner.

On the other hand, in the first exemplary embodiment, the maximum reception level is obtained among the data recorded in the reception strength recording unit 430, and then the angle position (peak position) of the antenna unit 110 where the maximum reception level is achieved is obtained as well (ST380). Further, the direction and the amount of gap between the current antenna angle position and the peak position are shown on the display screen for a worker (ST430). The worker can thereby adjust the orientation of the antenna unit 110, knowing a clear target position. Further, from the display of the gap, the worker can know in which direction and how much the antenna unit 110 should be moved, which significantly reduces the number of trials and errors. Therefore, according to the first exemplary embodiment, any worker can quickly and accurately install the antenna device 100.

(2) In the first exemplary embodiment, the angle position of the antenna unit is obtained by comparing the images that are taken by the camera. Because it is only necessary to obtain the angle position of the antenna unit as a relative displacement from the initial angle position or the peak position, the imaging direction of the camera is not limited to a specific direction. In other words, the antenna unit and the camera need not to be aligned. Accordingly, there is no need for costs and labor to attach a camera aligned to each antenna device.

(3) In this exemplary embodiment, the camera is not used as a sighting device. When the radio emitting direction is deviated even slightly from the antenna plane, even if the antenna orientation is adjusted at the correct direction to the antenna plane of the radio emitting source, it is not necessarily the orientation where the maximum reception level is achieved.

On the other hand, in this exemplary embodiment, the antenna orientation is set at the position where the reception level of radio waves is the highest.

(4) In this exemplary embodiment, only a slight displacement of the antenna unit 110 can be detected by using the camera image.

There is a technique that adds a rotary encoder to a moving part of the antenna device and detects the orientation of the antenna unit by an output value of the rotary encoder. (This structure is disclosed in Japanese Unexamined Patent Application Publication No. 2010-278807, for example.)

However, in order to detect the rotation of less than 1° by the rotary encoder, the diameter of the rotary encoder needs to be several tens cm, which causes an increase in the size of the antenna device. Further, the rotary encoder with such high accuracy is very expensive.

On the other hand, the structure using the camera as in this exemplary embodiment is inexpensive and does not cause an increase in the size of the antenna device. Further, as a distance from the camera 200 to an object is longer, a deviation of the object with a change in the camera angle is larger. Accordingly, by using the camera image, it is possible to detect a displacement of the camera 200 (i.e. the antenna unit 110) with a very high resolution.

(5) Because a displacement of the antenna unit is detected using the camera image in this exemplary embodiment, the resolution for displacement detection can be higher as the camera takes a scene as far away as possible.

The antenna device is installed in a high place or a place with a fine view to transmit and receive radio waves. Accordingly, when the camera is mounted on the antenna device, the camera is in the state of being able to take an image of distant objects. Thus, using the camera for detecting the orientation of the antenna unit has a significant effect.

In the environment where an image can be taken from only a short distance, it is necessary to use a highly accurate optical system in which aberration, distortion and the like are eliminated in order to detect a small displacement in image processing. In this case, a common digital camera is totally inadequate for use.

On the other hand, in the case of using the camera for adjusting the orientation of the antenna unit as in this exemplary embodiment, it is possible to take the image of a distant view, and it is therefore possible to meet demand sufficiently with a low-cost camera.

It should be noted that the present invention is not limited to the above-described exemplary embodiment and may be varied in many ways within the scope of the present invention.

In the processing unit 400, each of the image processing unit 410, the reception strength detection unit 420, the reception strength recording unit 430, the peak search unit 440 and the adjustment instruction unit 450 may be dedicated hardware composed of various logical elements and the like.

Alternatively, the functions of the image processing unit 410, the reception strength detection unit 420, the reception strength recording unit 430, the peak search unit 440 and the adjustment instruction unit 450 may be implemented by incorporating a given program into a computer having a CPU (Central Processing Device), a memory (storage device) and the like.

The above-described functional units may be implemented by installing an antenna mounting assistance program to the memory in the computer having the CPU and the memory through a communication means such as the Internet or a recording medium such as a CD-ROM or a memory card and causing the CPU or the like to operate with the installed program. The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-207054, filed on Sep. 20, 2012, the disclosure of which is incorporated herein in its entirety by reference.

REFERENCE SIGNS LIST

10 MAST
20 BUILDING
30 ANTENNA PATTERN
100 ANTENNA DEVICE
110 ANTENNA UNIT
120 TRANSMITTING AND RECEIVING UNIT
121 RECEIVING CIRCUIT
122 TRANSMITTING CIRCUIT
123 STORAGE BOX
130 MOUNTING MEANS
140 CLAMP MEANS
141 HOLDING MEMBER
142 RECEIVING MEMBER
143 FASTENING BOLT
150 ELEVATION ADJUSTMENT FITTING
151 BASE END OF ELEVATION ADJUSTMENT FITTING
152 LONG HOLE
153 MOUNTING SCREW
154 ADJUSTING SCREW
200 CAMERA
220 MOUNTING JIG
300 PERSONAL COMPUTER
310 DISPLAY UNIT
341 RECORD BUTTON
342 RECORD BUTTON
343 SEARCH BUTTON
400 PROCESSING UNIT
410 IMAGE PROCESSING UNIT
411 IMAGE CAPTURE UNIT
412 INITIAL IMAGE RECORDING UNIT
413 IMAGE MATCHING PROCESSING UNIT
414 DISPLACEMENT CALCULATION UNIT (POSITION CALCULATION UNIT)
420 RECEPTION STRENGTH DETECTION UNIT
430 RECEPTION STRENGTH RECORDING UNIT
440 PEAK SEARCH UNIT
450 ADJUSTMENT INSTRUCTION UNIT
451 PEAK POSITION RECORDING UNIT
452 GAP CALCULATION UNIT
R10 INITIAL IMAGE DISPLAY REGION
R20 CURRENT IMAGE DISPLAY REGION
R30 GRAPH DISPLAY REGION
R40 MAXIMUM RECEPTION DIRECTION DISPLAY REGION
R50 GAP DISPLAY REGION

The invention claimed is:

1. An antenna orientation adjustment assistance device comprising:

a reception strength detector detecting a reception strength of radio waves received by an antenna unit;

an initial image recorder recording a first image taken by a camera fixed relative to the antenna unit when the antenna unit is at an initial position as an initial image;

an image capturer capturing a second image taken by the camera when the antenna unit is at a current position moved from the initial position as a current image;

a displacement calculator calculates a displacement of the current image relative to the initial image based on comparison between the current image and the initial image;

a reception strength recorder recording the displacement and the reception strength at the displacement in association with each other;

a peak searcher searching for a maximum value of the reception strength among data recorded in the reception strength recorder; and a peak position recorder recording the displacement corresponding to a maximum reception strength obtained by the peak searcher as a peak position.

2. The antenna orientation adjustment assistance device according to claim 1, further comprising:

a gap calculator calculating a gap between a current angle position of the antenna unit and the peak position.

3. The antenna orientation adjustment assistance device according to claim 2, further comprising:

a display displaying the gap calculated by the gap calculator.

4. A computer-readable nonvolatile recording medium storing an antenna orientation adjustment assistance program causing a computer to function as:

a reception strength detector detecting a reception strength of radio waves received by an antenna unit;

an initial image recorder recording a first image taken by a camera fixed relative to the antenna unit when the antenna unit is at an initial position as an initial image;

an image capturer capturing a second image taken by the camera when the antenna unit is at a current position moved from the initial position as a current image;

a displacement calculator calculates a displacement of the current image relative to the initial image based on comparison between the current image and the initial image;

a reception strength recorder recording the displacement and the reception strength at the displacement in association with each other;

a peak searcher searching for a maximum value of the reception strength among data recorded in the reception strength recorder; and a peak position recorder recording the displacement corresponding to a maximum reception strength obtained by the peak searcher as a peak position.

5. The antenna device installation method according to claim 4, further comprising:

a step of calculating a gap between a current angle position of the antenna unit and the peak position; and a step of adjusting an orientation of the antenna unit by checking the gap so as to set the orientation of the antenna unit at the peak position.

6. An antenna device installation method comprising:

a step of temporarily installing an antenna device;

a step of mounting a camera on the antenna device so that a position and an orientation are not displaced relative to an antenna unit of the antenna device;

a step of recording a first image taken by the camera when the antenna unit is at an initial position as an initial image;

a step of recording a second image taken by the camera when the antenna unit is at a current position moved from the initial position as a current image;

a step of detecting a reception strength of radio waves received by the antenna unit;

a step of calculating a displacement of the current image relative to the initial image based on comparison between the current image and the initial image;

a reception strength recording step of recording the displacement and the reception strength at the displacement in association with each other;

a peak searching step of searching for a maximum value of the reception strength among data recorded in the reception strength recording step; and a step of recording the displacement corresponding to a maximum reception strength obtained in the peak searcher step as a peak position.

* * * * *